(12) United States Patent
Barrick et al.

(10) Patent No.: US 10,248,426 B2
(45) Date of Patent: Apr. 2, 2019

(54) DIRECT REGISTER RESTORE MECHANISM FOR DISTRIBUTED HISTORY BUFFERS

(71) Applicant: International Business Machines Corporation, Armonk, NY (US)

(72) Inventors: Brian D. Barrick, Pflugerville, TX (US); Steven J. Battle, Austin, TX (US); Joshua W. Bowman, Austin, TX (US); Christopher M. Mueller, Pflugerville, TX (US); Dung Q. Nguyen, Austin, TX (US); David R. Terry, Austin, TX (US); Eula Faye Tolentino, Austin, TX (US); Jing Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 15/163,314

(22) Filed: May 24, 2016

(65) Prior Publication Data
US 2017/0344380 A1    Nov. 30, 2017

(51) Int. Cl.
*G06F 9/38*    (2018.01)

(52) U.S. Cl.
CPC .......... *G06F 9/3863* (2013.01); *G06F 9/3857* (2013.01)

(58) Field of Classification Search
None
See application file for complete search history.

(56) References Cited

U.S. PATENT DOCUMENTS

| | | | | |
|---|---|---|---|---|
| 4,740,893 A | * | 4/1988 | Buchholz | G06F 9/30036 708/520 |
| 6,098,167 A | * | 8/2000 | Cheong | G06F 9/3863 712/217 |
| 6,799,268 B1 | | 9/2004 | Boggs et al. | |
| 7,487,335 B1 | * | 2/2009 | Chaudhry | G06F 9/3836 712/214 |
| 8,417,925 B2 | * | 4/2013 | Nguyen | G06F 9/3863 712/244 |
| 8,661,232 B2 | | 2/2014 | Penton et al. | |
| 8,677,104 B2 | | 3/2014 | Gibbs et al. | |
| 9,740,620 B2 | * | 8/2017 | Ayub | G06F 12/0875 |

(Continued)

OTHER PUBLICATIONS

Gupta et al., "Precise-Restartable Execution of Parallel Programs." Publication data not available.

(Continued)

*Primary Examiner* — Eric Coleman
(74) *Attorney, Agent, or Firm* — Patterson + Sheridan, LLP (57) ABSTRACT

Techniques are disclosed for restoring register data in a processor. In one embodiment, a method includes receiving an instruction to flush one or more general purpose registers (GPRs) in a processor. The method also includes determining history buffer entries of a history buffer to be restored to the one or more GPRs. The method includes creating a mask vector that indicates which history buffer entries will be restored to the one or more GPRs. The method further includes restoring the indicated history buffer entries to the one or more GPRs. As each indicated history buffer entry is restored, the method includes updating the mask vector to indicate which history buffer entries have been restored.

17 Claims, 5 Drawing Sheets

(56) References Cited

U.S. PATENT DOCUMENTS

| | | | |
|---|---|---|---|
| 2002/0073357 A1* | 6/2002 | Dhong | G06F 9/3861 |
| | | | 714/19 |
| 2004/0210749 A1* | 10/2004 | Biles | G06F 9/3848 |
| | | | 712/240 |
| 2008/0126744 A1* | 5/2008 | Moyer | G06F 9/30043 |
| | | | 712/4 |
| 2009/0037710 A1* | 2/2009 | Mavinakayanahalli | |
| | | | G06F 11/3644 |
| | | | 712/244 |
| 2014/0007066 A1* | 1/2014 | Kanhere | G06F 9/45516 |
| | | | 717/159 |

OTHER PUBLICATIONS

Moudgill et al., "Register renaming and dynamic speculation: an alternative approach." Proceedings of the 26th annual international symposium on Microarchitecture. IEEE Computer Society Press, 1993.

Smith et al., "The microarchitecture of superscalar processors." Proceedings of the IEEE 83.12 (1995): 1609-1624.

* cited by examiner

DIRECT REGISTER RESTORE MECHANISM FOR DISTRIBUTED HISTORY BUFFERS

BACKGROUND

The present disclosure generally relates to computer systems, and more specifically, to processing instructions.

In traditional computer processors, one or more history buffers back up data from general purpose registers (GPRs) when a new instruction is dispatched and the data in the target register needs to be saved. The data is saved in the history buffer in case that data needs to be restored to the GPRs in the future. One reason that the data is saved in the history buffer is branch prediction. If a branch instruction is received, circuitry can attempt to predict which way the branch will go before the branch has been executed. If the prediction is correct, the processor can continue processing. If the prediction is incorrect, processing is rolled back and the data in the registers is restored to the state that it was in before the mis-prediction. A flush process undoes these changes and restores the proper data from the history buffer to the GPRs. Other reasons that a flush might occur include errors, interrupts, load data misses, etc.

Some flush processes use the execution result bus to send history buffer entries that need to be restored to the GPRs. While this flush/restore process is underway, dispatch of a thread must be stopped to prevent collision of the dispatching instructions' target against the data from the restoring history buffers. This delay can significantly increase the penalty for branch mis-prediction and result in significant performance loss.

SUMMARY

One embodiment presented herein discloses a method for restoring register data in a processor. In one embodiment, a method comprises receiving an instruction to flush one or more GPRs in a processor. The method also comprises determining history buffer entries of a history buffer to be restored to the one or more GPRs. The method comprises creating a mask vector that indicates which history buffer entries will be restored to the one or more GPRs. The method further comprises restoring the indicated history buffer entries to the one or more GPRs. As each indicated history buffer entry is restored, the method comprises updating the mask vector to indicate which history buffer entries have been restored.

Other embodiments include, without limitation, a system for restoring register data having a processor and a memory, where the memory includes a program executable in the processor to perform operations for authenticating users, the operations comprising: receiving an instruction to flush one or more general purpose registers (GPRs). The operations further comprise determining history buffer entries of a history buffer to be restored to the one or more GPRs. The operations further comprise creating a mask vector that indicates which history buffer entries will be restored to the one or more GPRs. The operations further comprise restoring the indicated history buffer entries to the one or more GPRs. As each indicated history buffer entry is restored, the operations comprise updating the mask vector to indicate which history buffer entries have been restored.

Other embodiments include, without limitation, a computer program product that includes a computer readable storage medium having computer-readable program instructions that enables a processing unit to implement one or more aspects of the disclosed methods. The program instructions are executable by a processor to cause the processor to receive an instruction to flush one or more GPRs. The instructions are further executable by the processor to cause the processor to determine history buffer entries of a history buffer to be restored to the one or more GPRs. The instructions are further executable by the processor to cause the processor to create a mask vector that indicates which history buffer entries will be restored to the one or more GPRs. The instructions are further executable by the processor to cause the processor to restore the indicated history buffer entries to the one or more GPRs. As each indicated history buffer entry is restored, the instructions are further executable by the processor to cause the processor to update the mask vector to indicate which history buffer entries have been restored.

BRIEF DESCRIPTION OF THE SEVERAL VIEWS OF THE DRAWINGS

So that the manner in which the above-recited features of the present disclosure can be understood in detail, a more particular description of the disclosure, briefly summarized above, may be had by reference to the embodiments, some of which are illustrated in the appended drawings. It is to be noted, however, that the appended drawings illustrate only exemplary embodiments and are therefore not to be considered limiting of its scope, and may admit to other equally effective embodiments.

DETAILED DESCRIPTION

Embodiments presented herein disclose a system and method for restoring history buffer entries directly into the GPRs on a dedicated restore bus instead of using an execution result bus to transmit the history buffer entries. Embodiments herein also allow dispatching and execution of new instructions at the same time as the restoring process. In alternative embodiments, a result bus and restore bus are shared and arbitrate between one another The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

Figure 1:
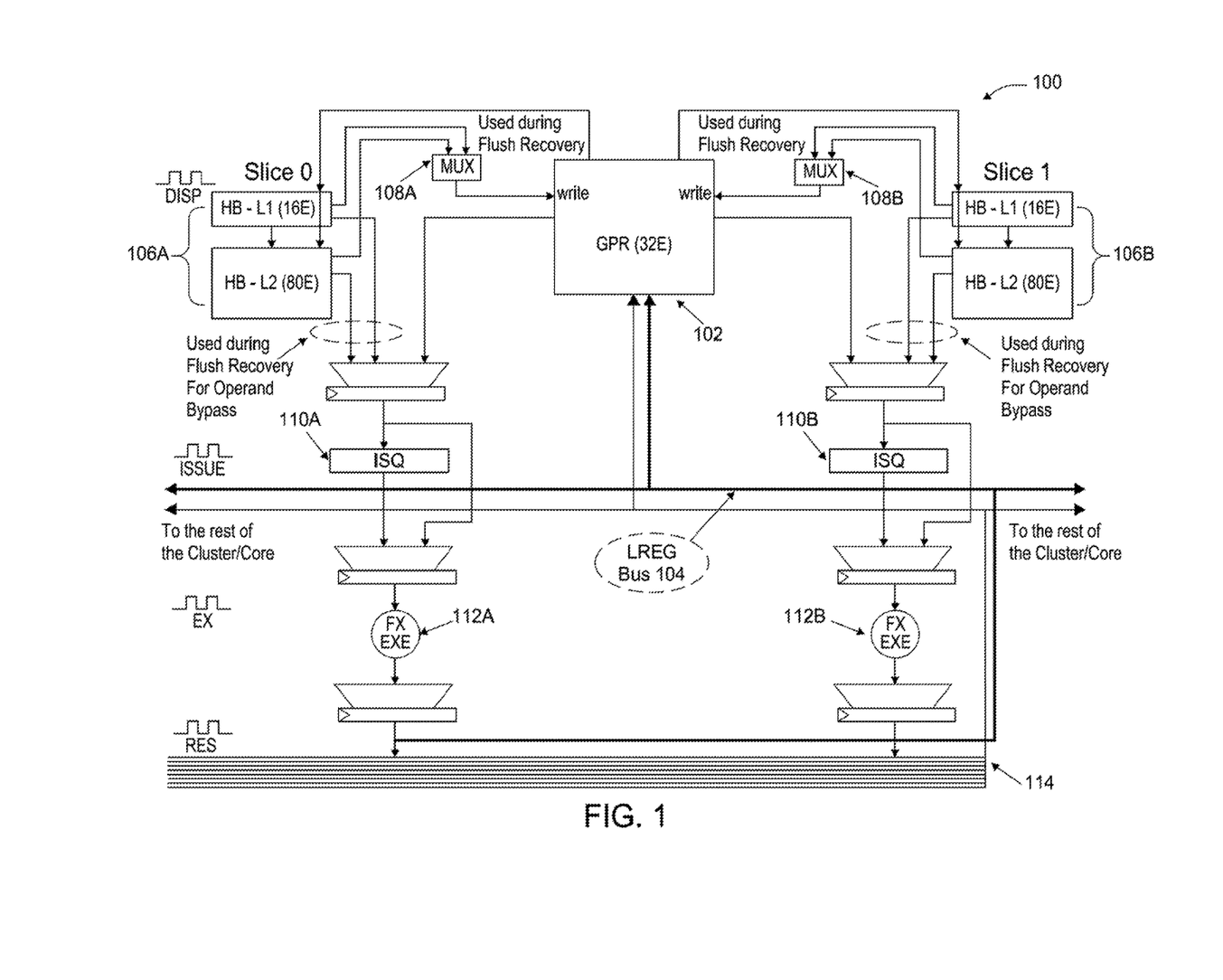
FIG. 1 illustrates an example system for directly restoring distributed history buffers.

FIG. 1 illustrates an example system 100 for directly restoring distributed history buffers. Specifically, FIG. 1 illustrates select components of a processor or processing system. GPRs 102 are illustrated. GPRs 102 can be any suitable type of general register files that stores data for operations. Any number of GPRs may be used in system 100. In example embodiments herein, 32 GPRs are utilized.

FIG. 1 further illustrates a distributed history buffer 106. Each execution slice of the processor has an associated history buffer. Slice 0 and Slice 1 are illustrated, but any suitable number of execution slices may be used. Slice 0 is illustrated with history buffer 106A, and Slice 1 is illustrated with history buffer 106B. In the implementation illustrated in FIG. 1, each history buffer 106 is comprised of Level 1 (L1) storage and Level 2 (L2) storage. In one embodiment, L1 is a smaller, more complex structure that holds fewer entries but is able to update the entry result data (result of the instruction execution). L2 is a larger but simpler structure that holds more entries but is unable to update result data on those entries. Entries can reside in L1 until all the data is ready, and then the entries are moved to L2. However, other embodiments may use only one type of memory for the history buffer. Each history buffer 106 stores entries evicted by the instructions issued to its associated slice. For example, 106A will store evicted data for instructions dispatched to slice0 and 106B will store evicted data for instructions dispatched to slice1.

FIG. 1 further comprises a logical register (LREG) bus 104. LREG bus 104 broadcasts information from the history buffer 106 to signify for what logical register the history buffer data is being restored so the GPRs 102 know in which entry to write the data. The use of the LREG bus 104 is described in further detail below.

FIG. 1 also comprises issue queues (ISQ) 110. Each slice has an associated issue queue 110. Issue queues 110A and 110B are illustrated. Also illustrated are execution units 112A and 112B for executing instructions in the respective slices. Results bus 114 is also illustrated. Results bus 114 transmits execution results to registers or other components in system 100.

In operation, embodiments described herein utilize a GPR recovery mask vector, or GPR mask vector, described in further detail below. GPRs 102 store data for the result of operations. When old data in a GPR 102 is overwritten by a younger dispatching instruction that writes the same logical register, the old data is stored in the history buffer 106. This data is stored in the history buffer 106 so that it can be restored to the GPRs in the future, if necessary. As an example, if an instruction is dispatched to slice 0, the entry that is displaced in slice 0 will be transferred to the slice 0 history buffer 106A. If an instruction is dispatched to slice 1, the entry that is displaced in slice 1 will be transferred to the slice 1 history buffer 106B. At restore time, both 106A and 106B (and any other history buffers associated with other slices) broadcast their restores to a common register file (i.e., GPRs 102).

If an incorrect branch prediction is made, system 100 needs to be restored to a point before the branch prediction so that the correct processing can proceed. Other events that may cause a flush include data errors, interrupts, load data misses, etc. At the time that the system is notified that a flush restore is needed, the current state of the system (i.e., the data stored in the GPRs 102 and the instructions that are being executed) needs to be overwritten with an older state. The data corresponding to the older state is stored in the history buffers 106. In existing processors, processing stops and the restore process begins. No processing occurs while data from history buffers 106 is placed into GPRs 102. Then, when the restore process is complete, processing begins again. In embodiments disclosed herein, however, instructions can continue to execute while the restore process is ongoing.

In the example embodiment described herein, a completion unit sends a signal that notifies system 100 that a branch prediction was incorrect. This signal could comprise a flush instruction tag (ITAG). System 100 then enters the restore process to restore the state of the system to the appropriate point, which was noted by the flush ITAG. A flush compare can be performed with the evictor ITAGs in the history buffer entries. The evictor ITAGs are the instruction that forces an entry to move from the GPRs 102 to the history buffers 106. When an instruction is moved to the history buffer it tracks its own ITAGs as well as its evictor's ITAG, which is the younger instruction writing to the same register that evicted out this instruction from the GPR. The evictor ITAG is used to pick which version of the GPR LREG, when multiple versions can exist in the history buffer, to restore at a flush point.

When the flush compare is completed, a vector of history buffer entries to be restored is created. History buffer logic also forms the GPR mask vector. The GPR mask vector indicates which GPR entries need to be restored. In one embodiment, the vector includes a bit for each GPR, and a bit is set to 1 indicate that the associated GPR entry needs to be restored, and set to 0 if the associated GPR entry does not need to be restored. The GPR mask vector can also include information per entry indicating whether the data is in the L1 history buffer or the L2 history buffer.

History buffer entries to be restored are read out and written directly to their respective GPRs. As GPRs are restored, history buffer logic updates the GPR mask vector to indicate which entries have been restored. This updating step can comprise clearing a bit in the GPR mask vector when the respective GPR entry has been restored. A key part of this process is that each history buffer has its local restore vector that is combined together with all other local restore vectors for each history buffer to form the global restore vector. Since each history buffer will be restoring different registers it is important to OR them all together to create a global picture of the whole machine state so it is known if a GPR needs to be restored from any history buffer. Also, since each GPR should only be restored from a single history buffer, it is acceptable to clear the entry based on a single history buffer restoring the entry. Each GPR should only have one version of itself that needs to be restored across all the versions that may exist across all history buffers. The evictor ITAG logic is able to use the flush ITAG to determine which is the correct version of the register to restore in order to return to the machine state before the flush point.

In existing processors, the data used for executing instructions is always in the current state of the processor. That is, the data for executing the instructions is stored in the GPRs. When a restore process occurs, processing stops until the restore is finished. Then, processing begins again with the data for execution stored in the GPRs. In embodiments described herein, however, the data needed to execute an instruction might be stored in the GPRs or might be stored in a history buffer, because the GPR has not been restored yet. In these embodiments, execution can occur while the restore process is ongoing, and therefore systems and methods are disclosed herein to determine where target and source data for instructions are located.

Figure 2:
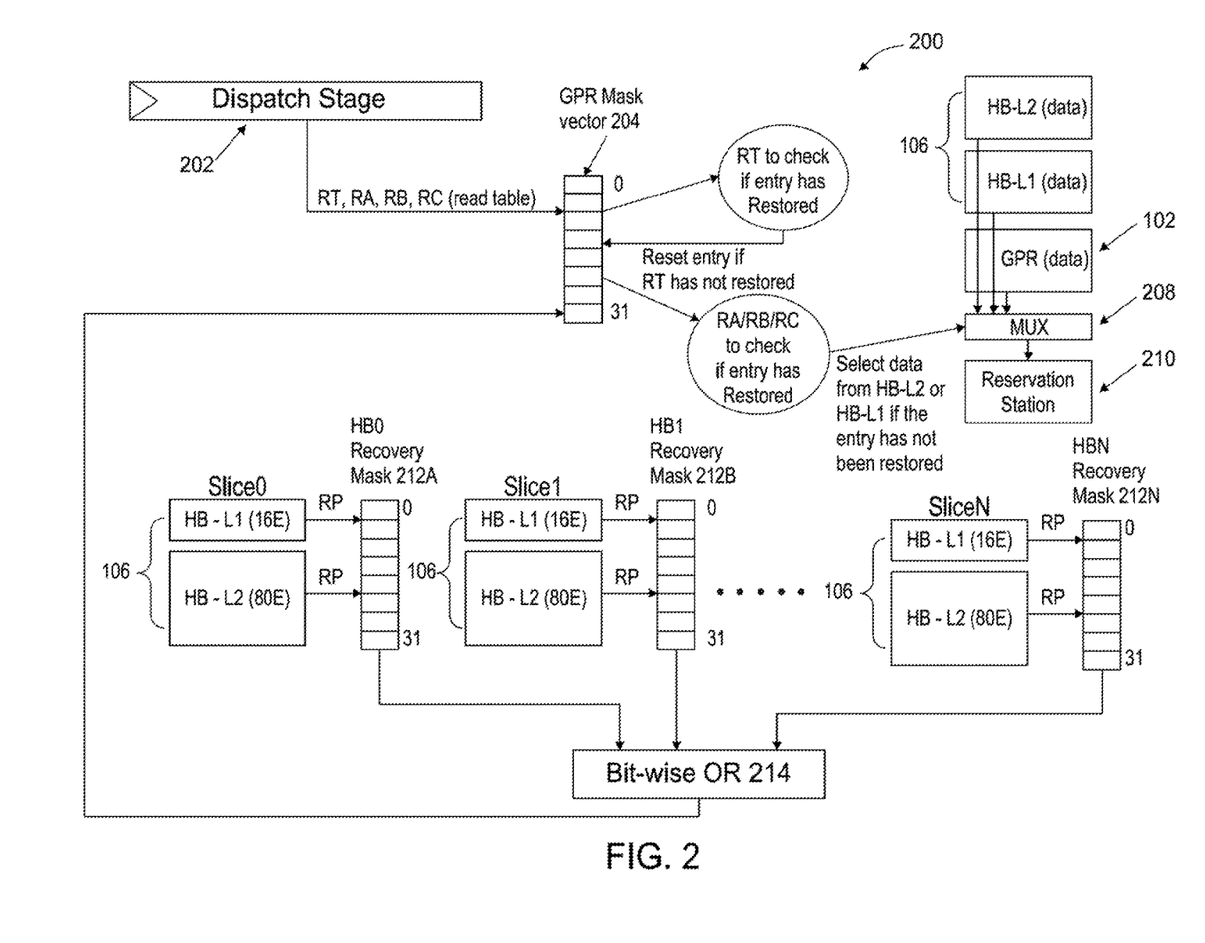
FIG. 2 illustrates another example system for directly restoring distributed history buffers.

FIG. 2 illustrates another view of a system 200 for directly restoring distributed history buffers. Some components in FIG. 2 are also illustrated in FIG. 1, such as history buffers 106 and GPRs 102. FIG. 2 illustrates N execution slices, each with its own history buffer 106. History buffer 106 stores the GPR entries that are evicted by instructions issued to that history buffer slice.

FIG. 2 comprises dispatch logic 202 and GPR mask vector 204. In this example, there are 32 GPRs, so 32 entries are illustrated in GPR mask vector 204, labeled 0-31. This is a global view of the machine state based on the accumulation of all distributed history buffer states. As noted above, the GPR mask vector indicates which GPR entries need to be restored. A bit set to 1 indicates that the associated GPR entry needs to be restored, and a bit set to 0 indicates that the associated GPR entry does not need to be restored. The GPR mask vector can also include information per entry indicating whether the data is in the L1 history buffer or the L2 history buffer.

When an instruction is dispatched for execution, dispatch logic 202 can read GPR mask vector 204 to determine whether data needs to be restored to a particular GPR. For example, dispatch logic 202 can read entry 0 of GPR mask vector 204 to see if GPR 0 needs to be restored. If there is a 1 stored in entry 0 of GPR mask vector 204, data needs to be restored to GPR 0. If there is a 0 stored in entry 0 of GPR mask vector 204, the data has already been restored to GPR 0 or does not need to be restored.

As an example, if the target (RT in FIG. 2) of a new instruction is GPR 0, dispatch logic 202 reads GPR mask vector 204 to determine if data needs to be restored to GPR 0. If entry 0 in GPR mask vector 204 is 0, then data has already been restored to GPR 0, or data does not need to be restored to GPR 0. The target information for the new instruction can then be written into GPR 0, and the existing entry in GPR 0 can be saved to the slice-specific history buffer 106A . . . N, depending on which slice the instruction is sent to.

If dispatch logic 202 reads GPR mask vector 204 and determines that entry 0 in GPR mask vector 204 is 1, then data has not been restored to GPR 0. Because the new instruction is going to write target data to GPR 0, it is unnecessary to restore data to GPR 0 from the history buffer and then immediately write over it by evicting it to the history buffer again. Therefore, new target data can be written to GPR 0. An indication is also sent to every history buffer 106A . . . N that this particular GPR should not be restored. The bit associated with GPR 0 in GPR mask vector 204 should also be cleared (i.e., set to 0) to indicate that this GPR does not need restored at this time.

Dispatch logic 202 performs a similar decision for the source operands (RA, RB, and RC in FIG. 2) of the dispatching instruction. Dispatch logic 202 reads the GPR mask vector 204 to determine if source operands can be read from the associated GPRs or read elsewhere. For example, a source operand may be stored in GPR 5. Dispatch logic reads entry 5 in GPR mask vector 204 to see if GPR 5 needs to be restored. If the entry is 0, a restore is not pending and the instruction can proceed, using the operand stored in GPR 5. If entry 5 in GPR mask vector 204 is 1, GPR 5 needs to be restored. The data cannot be read from the current state of the processor. However, the data that will be restored to GPR 5 is stored in the history buffer, and can be read with a history buffer bypass. The bit in entry 5 in the GPR mask vector 204 informs dispatch logic 202 that GPR 5 will be restored eventually, but the history buffer bypass allows the instruction to proceed without waiting for the restore. The history buffer bypass occurs if the instruction is being restored in the same cycle as the new instruction is being dispatched so the instruction can capture the data as it is being written to the GPR. If the restore has yet to happen, the issue queue will store the source register LREG and set a mark to indicate that the source data will be coming from an upcoming history buffer restore. The issue queue would then continuously compare the source register LREG to the history buffer direct restore LREGs that are being sent to the GPR and capture the restore data if the LREG matches. Since there should only be one restore per LREG, LREGs can be compared without additional qualification. Therefore, at dispatch time each instruction source sent to the issue queue can either be marked as coming from the history buffer restore where it will use the history buffer restore LREG bus to compare or it will be marked to pick up its data from the result bus after its producer instruction executes.

FIG. 2 conceptually illustrates the processes described above. Dispatch logic 202 reads the GPR mask vector 204. The target of the instruction is designated as RT. Dispatch logic checks to see if the target has been restored (a 0 entry in the GPR mask vector 204) or if the target entry has a pending restore (a 1 entry in the GPR mask vector 204). If there is a pending restore, an indication is sent to history buffer 106 that this particular GPR should not be restored, and the bit in GPR mask vector 204 is cleared to indicate that the GPR does not need restored. The GPR does not need to be restored because the instruction writing the GPR will end up evicting the previous entry to the history buffer as is done during normal processing. However, in this case, since a restore is happening, the entry would be restored and then immediately evicted out so it is more efficient to leave it in the history buffer.

Also illustrated in FIG. 2 is the source check (RA, RB, RC) to see if an entry has restored. If the GPR mask vector 204 entry is 0, the GPR has been restored and the source operands can be retrieved from the respective GPR. If the GPR mask vector 204 entry is 1 for a source operand, the source data can instead be obtained from the history buffer as shown on the top right side of FIG. 2. Multiplexer 208 allows source data to be retrieved from either L1 or L2 of the history buffer 106 or from a GPR 102, depending on the location of the data as determined by the bits in GPR mask vector 204. An L1/L2 bit can be read from the GPR restore vector that would control multiplexer 208 to select between L1 or L2. Multiplexer 208 then sends the correct data to reservation station 210.

The bottom half of FIG. 2 illustrates the multiple slices and history buffers in an example embodiment. Each slice has an associated history buffer 106. Also associated with each history buffer 106 is a recovery mask 212 labeled 212A, 212B, . . . 212N. The recovery masks 212 and bit-wise OR 214 check to see if each history buffer 106 has restored the GPR data. Performing an OR operation is done to determine if any history buffer has a pending restore for a register by combining all the local history buffer vectors into a single global vector. Since each GPR will only come from one history buffer, all the recovery vectors must be combined to get a complete picture of machine state. Once each history buffer 106 has restored a specific GPR in each slice, the bit in GPR mask vector 204 that indicates whether a restore has occurred can be reset to 0.

Figure 3:
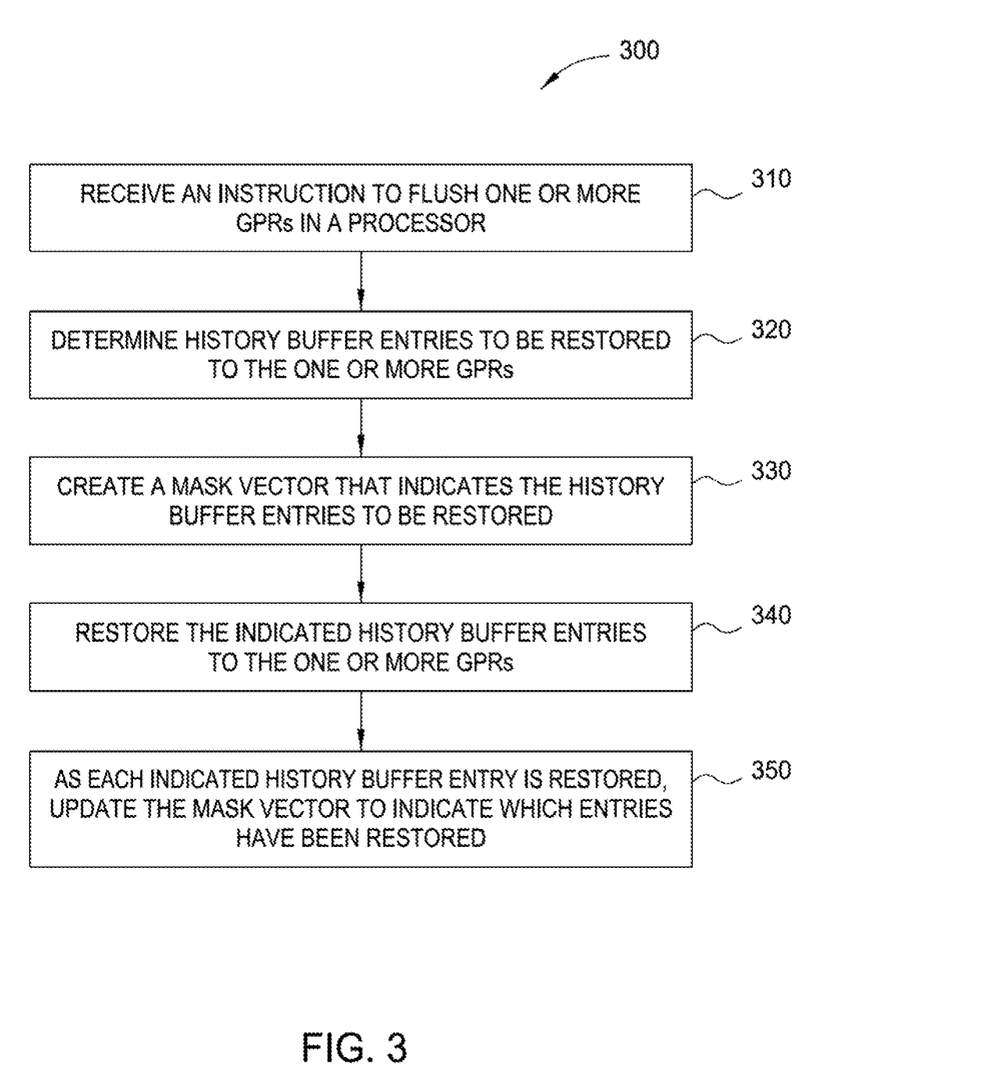
FIG. 3 is a flow diagram illustrating an example method for directly restoring distributed history buffers.

FIG. 3 is a flow diagram that illustrates a method for directly restoring distributed history buffers. Although the method steps are described in conjunction with the systems of FIGS. 1-2, persons skilled in the art will understand that any system configured to perform the method steps, in any suitable order, falls within the scope of the present invention. In various embodiments, the hardware and/or software elements described above in FIGS. 1-2 can be configured to perform the method steps of FIG. 3.

A method 300 begins at step 310 where a processor receives an instruction to flush one or more GPRs in the processor. For example, a completion unit may send a signal that notifies a processing system that a branch prediction is incorrect. The processing system needs to be flushed and restored to a previous state so that the correct processing can commence.

At step 320, the processing system determines history buffer entries of a history buffer to be restored to the one or more GPRs. A flush instruction tag may be used to notify the history buffers which instruction tag needs to be restored. For example, if instruction 10 was a mis-prediction then all instructions younger than 10 would need to be flushed and the machine state restored to the state existing when instruction 10 was initially dispatched, and undo any of the changes done by instructions after instruction 10. Entries in the history buffers have instruction tags attached to the data stored in the buffer so that the correct data to restore can be determined.

At step 330, history buffer logic creates a mask vector that indicates which history buffer entries will be restored to the one or more GPRs. In one embodiment, the mask vector includes a bit that indicates the restore status for each GPR. This is composed of combining together all the local history buffer recovery vectors into a global GPR recovery vector. The bit is set to 1 if the GPR needs to be restored with data from the history buffer, and 0 if the GPR does not need to be restored.

The method proceeds to step 340, where the history buffer entries are restored to the one or more GPRs. All the history buffers are able to restore at the same time since each history buffer would have a restore bus allowing them to all simultaneously restore to one or more GPRs and one or more issue queues.

At step 350, history buffer logic updates the mask vector to indicate which history buffer entries have been restored to the GPRs. In one embodiment, a bit is cleared in the GPR mask vector to indicate that the restore has occurred. In some embodiments, a bus, such as the LREG bus described above, broadcasts an indication when a specific register has been restored. Instructions that are waiting for a particular GPR to be restored can be processed when the indication is received on the LREG bus. The issue queue looks at the restore LREGs and picks up data if it has an entry with a source whose LREG matches this restore LREG and is marked as dependent on a history buffer restore for its data.

Figure 4:
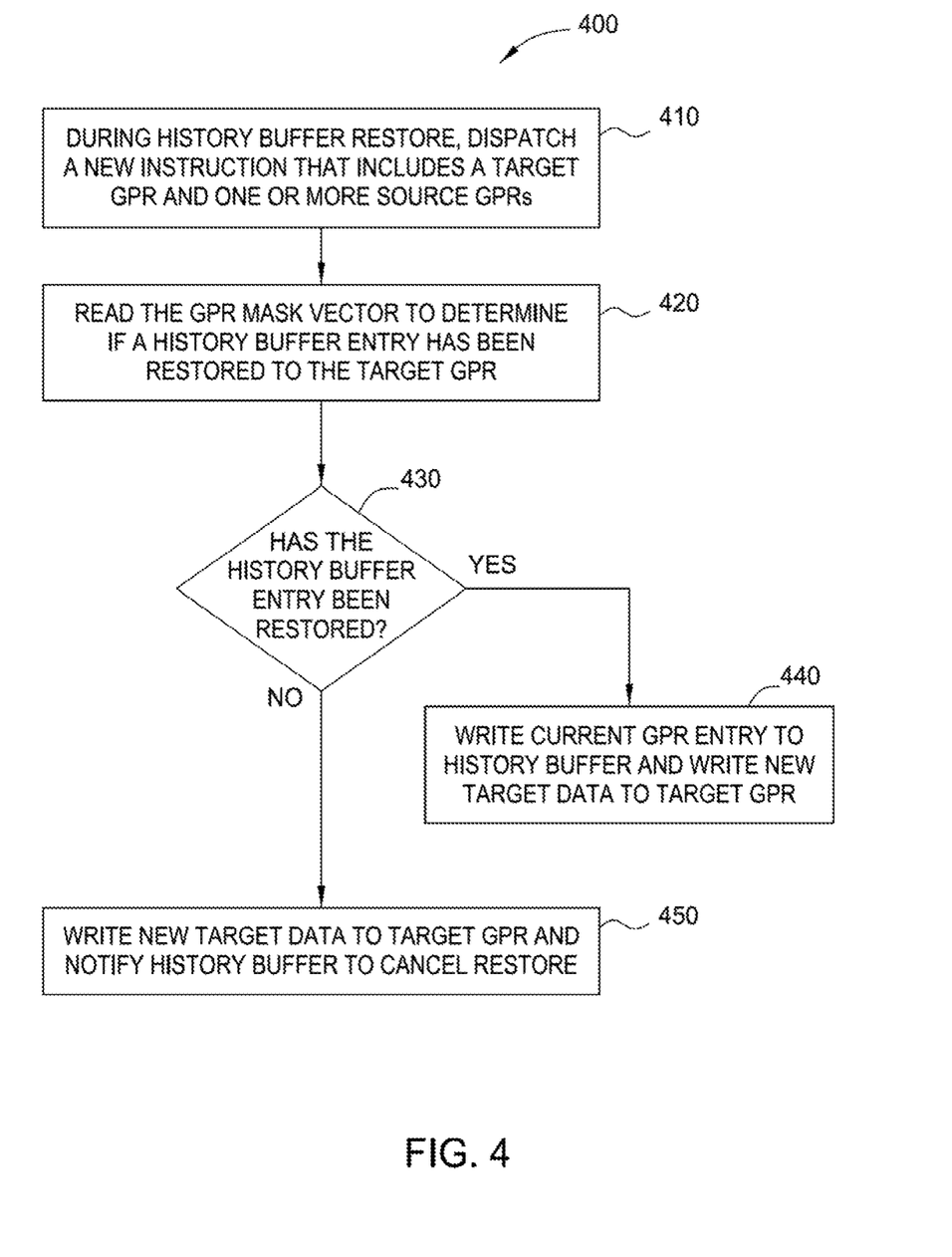
FIG. 4 is another flow diagram illustrating an example method for directly restoring distributed history buffers.

FIG. 4 is a flow diagram that illustrates additional steps of a method for directly restoring distributed history buffers. Although the method steps are described in conjunction with the systems of FIGS. 1-2, persons skilled in the art will understand that any system configured to perform the method steps, in any suitable order, falls within the scope of the present invention. In various embodiments, the hardware and/or software elements described above in FIGS. 1-2 can be configured to perform the method steps of FIG. 4.

A method 400 begins at step 410 where a history buffer restore process has been initiated according to embodiments describes herein. During restoration of the history buffer entries, dispatch logic dispatches a new instruction that includes a target GPR and one or more source GPRs. A result of the instruction will be written to the target GPR.

The method proceeds to step 420, where dispatch logic reads the GPR mask vector to determine if a history buffer entry has been restored to the target GPR. In one embodiment, a 1 in the GPR mask vector for the target GPR indicates that the target GPR has a pending restore. A 0 in the GPR mask vector for the target GPR indicates that the target GPR has either already been restored or does not need to be restored. Any other suitable indication may be used in other embodiments.

The method proceeds to step 430, where a decision block determines whether the history buffer entry has been restored. If the history buffer entry has been restored (i.e., the GPR mask vector bit is 0), the method proceeds to step 440. At step 440, the current GPR entry is written to the history buffer, with the appropriate instruction tags, and new target data is written to the target GPR. Processing then continues to the next instruction.

If, at step 430, the history buffer entry has not been restored to the target GPR (i.e., the GPR mask vector bit is 1), the method proceeds to step 450. At step 450, new target data is written into the target GPR. In addition, a notification is transmitted to the history buffer that the history buffer entry to be restored to the target GPR should not be restored. This notification step can be performed by broadcasting the destination LREGs to all history buffers and the history buffer associated with that LREG would match and clear its local restore bit. The history buffer logic can then clear the bit in the GPR vector mask to 0 for the target GPR, indicating that the target GPR does not need to be restored.

Figure 5:
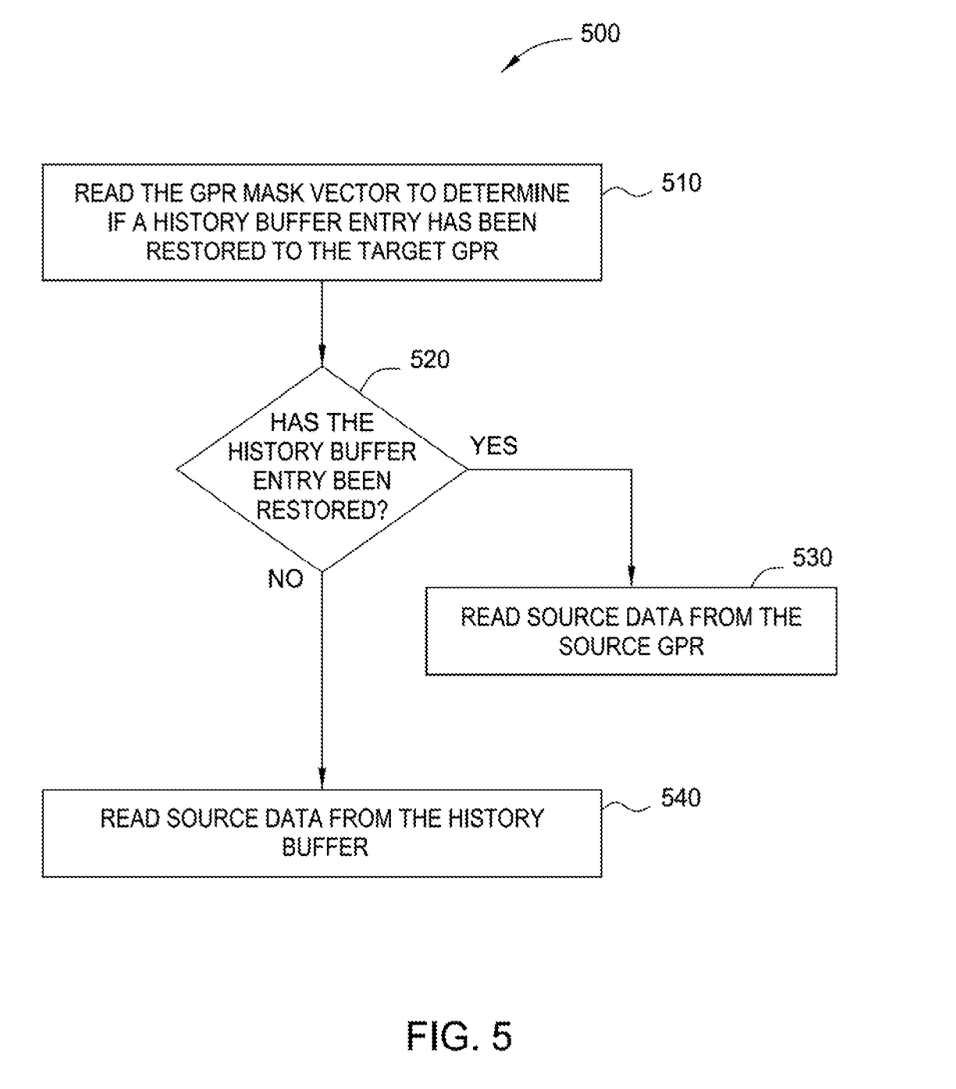
FIG. 5 is another flow diagram illustrating an example method for directly restoring distributed history buffers.

FIG. 5 is a flow diagram that illustrates additional steps of a method for directly restoring distributed history buffers. Although the method steps are described in conjunction with the systems of FIGS. 1-2, persons skilled in the art will understand that any system configured to perform the method steps, in any suitable order, falls within the scope of the present invention. In various embodiments, the hardware and/or software elements described above in FIGS. 1-2 can be configured to perform the method steps of FIG. 5.

A method 500 begins at step 510 where a history buffer restore process has been initiated according to embodiments describes herein. During restoration of the history buffer entries, dispatch logic dispatches a new instruction that includes a target GPR and one or more source GPRs. At step 510, dispatch logic reads the GPR mask vector to determine if a history buffer entry has been restored to a source GPR. In one embodiment, a 1 in the GPR mask vector for the source GPR indicates that the source GPR has a pending restore. A 0 in the GPR mask vector for the source GPR indicates that the source GPR has either already been restored or does not need to be restored. Any other suitable indication may be used in other embodiments.

The method proceeds to step 520, where a decision block determines whether the history buffer entry has been restored. If the history buffer entry has been restored (i.e., the GPR mask vector bit is 0), the method proceeds to step 530. At step 530, the source data is read from the source GPR.

If, at step 520, the history buffer entry has not been restored to the source GPR (i.e., the GPR mask vector bit is 1), the method proceeds to step 540. At step 540, the source data is read from the history buffer instead of waiting for the source data to be written to the indicated source GPR. The data can be read from the history buffer with a history buffer bypass. If the restore is happening in the overlapping cycles with dispatch, the restore bypass with the history buffer data can be used as the dispatch is reading the register file. If the GPR is marked for restore but restore has not occurred yet, then the issue queue will mark the source which reads the restore bit as set as dependent on history buffer restore. The issue queue will then look at the history buffer restore LREG bus and when there is a match, bypass the history buffer restore data into the reservation station. Since the restoring entry could be coming from any history buffer, each issue queue must be able to pick up data from any history buffer. Therefore, the processing system can continue processing instructions during a restore process instead of halting all execution.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the present disclosure may be devised without departing from the basic scope thereof, and the scope thereof is determined by the claims that follow.

What is claimed is:

1. A method for restoring register data, comprising:
   receiving an instruction to flush one or more general purpose registers (GPRs) in a processor;
   determining history buffer entries of a history buffer to be restored to the one or more GPRs;
   creating a mask vector that indicates which history buffer entries will be restored to the one or more GPRs and also indicates whether each history buffer entry is in a Level 1 (L1) storage or a Level 2 (L2) storage;
   restoring the indicated history buffer entries to the one or more GPRs; and
   as each indicated history buffer entry is restored, updating the mask vector to indicate which history buffer entries have been restored.

2. The method of claim 1, further comprising:
   during restoration of the history buffer entries, dispatching a new instruction that includes a target GPR;
   reading the mask vector to determine if a history buffer entry has been restored to the target GPR;
   if the history buffer entry has been restored to the target GPR, writing the restored history buffer entry to the history buffer and writing new data into the target GPR; and
   if the history buffer entry has not been restored to the target GPR, writing the new data into the target GPR and transmitting a notification to the history buffer that the history buffer entry for the target GPR should not be restored.

3. The method of claim 2, further comprising:
   reading the mask vector to determine if a history buffer entry has been restored to a source GPR;
   if the history buffer entry has been restored to the source GPR, reading source data from the source GPR; and
   if the history buffer entry has not been restored to the source GPR, reading source data from the history buffer.

4. The method of claim 3, wherein a multiplexer determines whether source data is read from the source GPR or from the history buffer.

5. The method of claim 1, further comprising:
   broadcasting an indication on a bus when each history buffer entry has been restored to one of the one or more GPRs.

6. The method of claim 1, wherein updating the mask vector comprises clearing a bit in the mask vector corresponding to the history buffer entry that has been restored.

7. The method of claim 1, wherein determining history buffer entries of a history buffer to be restored to the one or more GPRs further comprises receiving an instruction tag associated with the instruction to flush the one or more GPRs, wherein the instruction tag indicates which history buffer entries to restore to the one or more GPRs.

8. The method of claim 1, wherein the history buffer is a distributed history buffer, and wherein the processor comprises a plurality of execution slices, each execution slice comprising an associated history buffer.

9. A computer program product for restoring register data, said computer program product comprising:
   a computer readable storage medium having instructions stored thereon, the instructions executable by a processor to cause the processor to:
   receive an instruction to flush one or more general purpose registers (GPRs);
   determine history buffer entries of a history buffer to be restored to the one or more GPRs;
   create a mask vector that indicates which history buffer entries will be restored to the one or more GPRs and also indicates whether each history buffer entry is in a Level 1 (L1) storage or a Level 2 (L2) storage;
   restore the indicated history buffer entries to the one or more GPRs; and
   as each indicated history buffer entry is restored, update the mask vector to indicate which history buffer entries have been restored.

10. The computer program product of claim 9, the instructions further executable by the processor to cause the processor to:
    during restoration of the history buffer entries, dispatch a new instruction that includes a target GPR;
    read the mask vector to determine if a history buffer entry has been restored to the target GPR;
    if the history buffer entry has been restored to the target GPR, write the restored history buffer entry to the history buffer and writing new data into the target GPR; and
    if the history buffer entry has not been restored to the target GPR, write the new data into the target GPR and transmitting a notification to the history buffer that the history buffer entry for the target GPR should not be restored.

11. The computer program product of claim 10, the instructions further executable by the processor to cause the processor to:
    read the mask vector to determine if a history buffer entry has been restored to a source GPR;
    if the history buffer entry has been restored to the source GPR, read source data from the source GPR; and
    if the history buffer entry has not been restored to the source GPR, read source data from the history buffer.

12. The computer program product of claim 11, wherein a multiplexer determines whether source data is read from the source GPR or from the history buffer.

13. The computer program product of claim 9, the instructions further executable by the processor to cause the processor to:
    broadcast an indication on a bus when each history buffer entry has been restored to one of the one or more GPRs.

14. The computer program product of claim 9, the instructions further executable by the processor to cause the processor to:
update the mask vector by clearing a bit in the mask vector corresponding to the history buffer entry that has been restored.

15. A system for restoring register data, comprising:
a processor; and
a memory, wherein the memory includes a program executable in the processor to perform operations for authenticating users, the operations comprising:
receiving an instruction to flush one or more general purpose registers (GPRs);
determining history buffer entries of a history buffer to be restored to the one or more GPRs;
creating a mask vector that indicates which history buffer entries will be restored to the one or more GPRs;
restoring the indicated history buffer entries to the one or more GPRs;
as each indicated history buffer entry is restored, updating the mask vector to indicate which history buffer entries have been restored;
during restoration of the history buffer entries, dispatching a new instruction that includes a target GPR;
reading the mask vector to determine if a history buffer entry has been restored to the target GPR;
if the history buffer entry has been restored to the target GPR, writing the restored history buffer entry to the history buffer and writing new data into the target GPR; and
if the history buffer entry has not been restored to the target GPR, writing the new data into the target GPR and transmitting a notification to the history buffer that the history buffer entry for the target GPR should not be restored.

16. The system of claim 15, wherein the operations further comprise:
reading the mask vector to determine if a history buffer entry has been restored to a source GPR;
if the history buffer entry has been restored to the source GPR, reading source data from the source GPR; and
if the history buffer entry has not been restored to the source GPR, reading source data from the history buffer.

17. The system of claim 15, wherein the operations further comprise:
broadcasting an indication on a bus when each history buffer entry has been restored to one of the one or more GPRs.

* * * * *